United States Patent
Holderle

(10) Patent No.: US 9,278,361 B2
(45) Date of Patent: Mar. 8, 2016

(54) CLOSABLE CENTRIFUGE CONTAINER

(71) Applicant: ANDREAS HETTICH GMBH & CO. KG, Tuttlingen (DE)

(72) Inventor: Andreas Holderle, Doggingen (DE)

(73) Assignee: ANDREAS HETTICH GMBH & CO. KG, Tuttlingen (DE)

( * ) Notice: Subject to any disclaimer, the term of this patent is extended or adjusted under 35 U.S.C. 154(b) by 0 days.

(21) Appl. No.: 14/363,809

(22) PCT Filed: Dec. 7, 2012

(86) PCT No.: PCT/EP2012/074845
§ 371 (c)(1),
(2) Date: Jun. 8, 2014

(87) PCT Pub. No.: WO2013/083805
PCT Pub. Date: Jun. 13, 2013

(65) Prior Publication Data
US 2014/0348726 A1    Nov. 27, 2014

(30) Foreign Application Priority Data
Dec. 8, 2011  (DE) .......................... 10 2011 056 164

(51) Int. Cl.
*B04B 5/04* (2006.01)
*B65D 5/46* (2006.01)

(52) U.S. Cl.
CPC ............... *B04B 5/0421* (2013.01); *B65D 5/46* (2013.01); *B65D 2251/1008* (2013.01); *B65D 2251/1016* (2013.01)

(58) Field of Classification Search
CPC ............ B04B 7/08; B04B 7/02; B04B 5/0421
USPC ............................................ 422/548; 494/40
See application file for complete search history.

(56) References Cited

U.S. PATENT DOCUMENTS

| | | | |
|---|---|---|---|
| 2002/0085957 A1* | 7/2002 | Moore et al. | 422/102 |
| 2010/0004109 A1* | 1/2010 | Ballhause | B04B 5/0421 494/40 |
| 2013/0116104 A1* | 5/2013 | Koehn | B04B 5/0421 494/60 |

FOREIGN PATENT DOCUMENTS

| | | |
|---|---|---|
| CA | 1008015 A1 | 4/1977 |
| DE | 20110 247 U1 | 11/2002 |
| DE | 10128539 A1 | 1/2003 |
| DE | 10 2008 031 502 B4 | 5/2010 |
| DE | 10 2011100 209 A1 | 11/2012 |
| EP | 1 059 239 A1 | 12/2000 |

OTHER PUBLICATIONS

The International Bureau of WIPO, PCT Translation of the International Preliminary Report on Patentability, Jun. 19, 2014, pp. 1-11, International Application No. PCT/EP2012/074845, International filing date: Dec. 7, 2012, Applicant: Andreas Hettich GmbH & Co. KG, Switzerland.
International Search Report, PCT/SP2012/074845, May 2, 2013 Mail Date, 3 Pages.
German Patent Application 10 2011 056 164.1, Decision to Grant, May 22, 2014, 3 Pages.
German Patent Application 10 2011 056 164.1, German Office Action, September 5, 2012.

* cited by examiner

*Primary Examiner* — Jill Warden
*Assistant Examiner* — Jacqueline Brazin
(74) *Attorney, Agent, or Firm* — Woodling, Krost and Rust

(57) ABSTRACT

A centrifuge container comprising a centrifuge bucket, a locking lever and a lid is disclosed. The lid is adapted to be locked on the centrifuge bucket, and the locking lever is adapted to be pivoted from an open position to a closed position. The lid and centrifuge bucket can be made to engage each other via respective connection means by means of the locking lever such that the lid will be locked in place in the closed position of the lever and will be released in the open position of the lever. The locking lever is provided in the form of a carrying handle and that carrying handle is adapted to be pivotably mounted on one carrying handle mounting unit integrally formed on the centrifuge bucket, and that the carrying handle, in its closed position, allows the centrifuge container to be carried by means of the carrying handle.

18 Claims, 4 Drawing Sheets

CLOSABLE CENTRIFUGE CONTAINER

Figure 1:
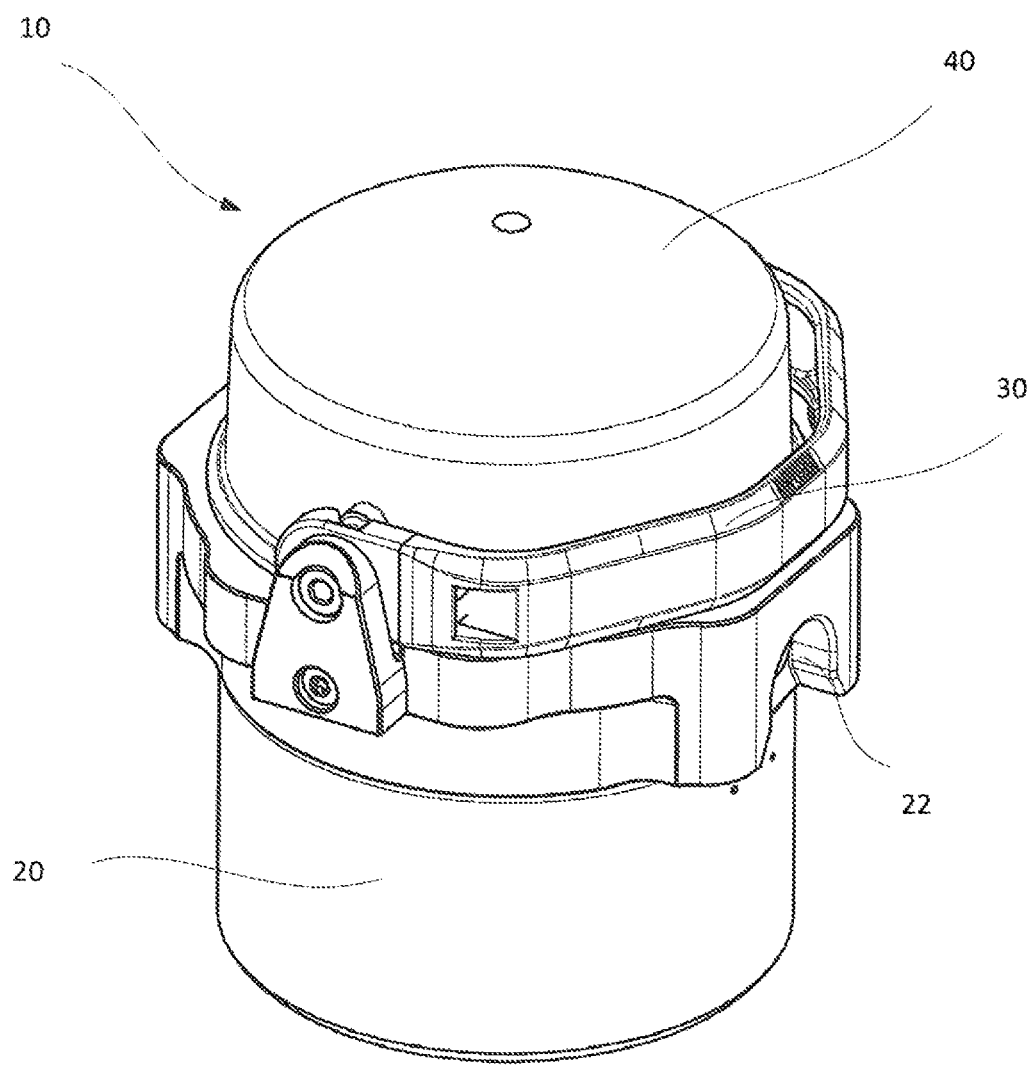

This patent application is the national phase entry of PCT/EP2012/074845. PCT/EP2012/074845, international application filing date Dec. 7, 2012, claims the benefit and priority of and to German patent application no. DE 10 2011 056 164.1, filed Dec. 8, 2011. German patent application no. DE 10 2011 056 164.1, filed Dec. 8, 2011, is incorporated herein by reference hereto in its entirety.

The invention relates to a closable centrifuge container.

It is considered advantageous for centrifuge buckets to be closable because material to be centrifuged may otherwise easily leak from an open centrifuge container during handling or centrifugation. If a centrifuge container can be closed, in particular in an aerosol-tight manner, this may prevent contamination of the environment in the event a receptacle contained in said centrifuge container breaks. On the other hand, this also prevents contamination of sensitive material to be centrifuged.

Known from the prior art are centrifuge containers which have a lid that can be closed by means of a lever.

Disclosed in DE 10 2008 031 502 B4 for example is a centrifuge bucket with a closable lid. Mounted on said lid is a lever which can be operated to close the lid on the centrifuge bucket. The clamping force required for this purpose also has a horizontal force component, in addition to a vertical force component. This results in improved sealing properties of the lid. Furthermore, it completely prevents any shifting of the lid during centrifugation.

It is the object of the present invention to provide a centrifuge container with a closable lid which is especially easy to use.

As is known from the prior art, a closable centrifuge container comprises a centrifuge bucket and a lid which is provided with a locking lever. The lid can be closed on the centrifuge bucket by pivoting the lever. For this purpose, respective matching connection means are provided which can be made to engage each other by means of said locking lever.

In accordance with the invention, the locking lever is designed as a carrying handle which can be pivotably mounted on at least one carrying lever mounting unit integrally formed on said centrifuge bucket. Furthermore, the carrying handle is designed and arranged such that it will allow the centrifuge bucket to be carried by means of the carrying handle when the latter is in its closed position. In the description below, this position is also referred to as the vertical position.

In particular, the mounting units for the carrying handle are disposed on the upper edge of each centrifuge bucket, with the carrying handle—in an open position thereof—resting on the centrifuge bucket edge and—in a carrying position thereof—extending perpendicularly to the opening area of the centrifuge bucket. As the lid can be locked by simply moving the locking lever to different positions, only one hand is needed to accomplish this.

This specific design of a centrifuge container has the advantage that the centrifuge container can be closed, opened and transported in a simple manner, owing to the synergetic use of the closing lever as a carrying handle.

In accordance with another aspect of the invention, the locking lever may be supported in such a way that the locking lever is mounted in a mounting unit provided on the centrifuge bucket. For this purpose, the locking lever is provided with a guideway which matches respective guide elements provided on the lid so that pivoting the locking lever will secure the lid in its closing position on the container. When the guide element engages the guideway, this will generate a clamping force on the lid which will press the lid onto the container.

The locking lever thus allows the container to be carried even without a lid, although the lid can still be locked by means of the locking lever.

In a particularly advantageous embodiment of the invention, the respective matching connection means and the carrying handle are designed such that the carrying handle can be moved from an open position thereof to a first closed position thereof which corresponds to the carrying position. The carrying handle can furthermore be designed such that it can be pivotally moved beyond the carrying position to a second closed position thereof. In its second closed position, the carrying handle preferably rests on the edge of the centrifuge bucket again. This results in a very compact design which also improves the centrifugation characteristics of the bucket.

According to an advantageous embodiment of the invention, two carrying handle mounting units are provided at opposite positions on the centrifuge bucket. One end each of a carrying handle can be pivotably connected to said mounting units. Mounting the carrying handle in two places has the advantage that this increases the stability and the maximum possible weight load of the centrifuge container compared to a container in which the handle is attached on one side only. As a locking mechanism is preferably integrated in the mounting area, mounting the handle in two places, and in particular symmetrically, results in a uniform distribution of force.

In yet another advantageous embodiment of the invention, the carrying handle is detachably mounted on the mounting unit on the container. Such a detachable arrangement of the handle may include loss protection means so as to prevent the carrying handle from being lost when there is no lid on the container.

The loss protection means may be designed such that recesses are provided in the container edge. These recesses are adapted to the carrying handle in such a way that the carrying handle—in a vertical position thereof—engages each recess such that the handle will not be able to move in a horizontal direction, yet will be free to move horizontally in a horizontal position thereof.

Connecting the carrying handle to its mounting unit on the centrifuge container may for example be accomplished by a design in which an outwardly extending pin integrally formed on the peripheral area of the carrying handle end engages an aperture-like recess in the mounting unit of said container. The carrying handle can then be attached to the centrifuge container by horizontally inserting it in its mounting unit.

By preventing horizontal movement by way of a lid located between two connection areas, on the one hand, and a recess in which the carrying handle engages in a vertical position thereof when the container is being carried, on the other hand, the carrying handle can be secured against accidental release. However, the carrying handle can be removed if required when the handle is in its horizontal position and there is no lid.

According to the invention, the connection means are designed such that the lid has connection means, in particular in the form of integral bolt-like elements. These bolt-like elements can be locked in recesses of a locking mechanism provided on the centrifuge container, by a pivotal movement of the carrying handle.

The recesses on the centrifuge container may be provided directly in the carrying handle which is adapted to be mounted on the centrifuge container. This has the advantage that the pivotable lever, i.e. the carrying handle, can be directly used as a locking means.

Preferably, such recess, in particular in the carrying handle, is provided in the form of a guideway. Guided within said guideway during movement of the carrying handle is a connection means integrally formed on the lid, in particular a bolt or a pin, which will be locked successively. Interaction of the guideway and the pin will result in a clamping force to be exerted on the lid.

In the open position of the handle, i.e. its horizontal position, the guideway provided in the carrying handle may have a recess which is open in a vertical direction. Following said vertically extending opening, a passage is provided in said carrying handle. This passage essentially extends radially around the axis of rotation of the handle and extends around the point of rotation in a direction opposite the direction of rotation.

In this way, by moving the carrying handle once it has been made to engage the pin of the lid, the lid can be locked particularly easily in position on the centrifuge bucket.

Advantageously, catch means may be provided within said guideway which can be used to temporarily lock the carrying handle at least in a carrying position thereof.

In a particularly advantageous embodiment, the mounting unit of the carrying handle is provided on the outside of the centrifuge bucket. This means that the carrying handle is inserted in the mounting units from the inside which will cause the respective mounting units to be pressed into each other during centrifugation of the centrifuge container. The side of the carrying handle which faces in the direction of the container space is where the guideway may be provided in the carrying handle. The guideway will then accommodate the guiding pins of the lid.

Pivoting the carrying handle will cause the lid to be moved vertically downward, due to its guideway within the carrying handle, and thus be clamped onto the centrifuge container. Merely pivoting the carrying handle from its horizontal position into a vertical carrying position will already fix the lid in its position.

If the carrying handle is pivoted further by 90°, i.e. moved to a horizontal position again, the guiding pin on the lid will also be moved further within the carrying handle such that the latter will be unable to change its vertical position with respect to the container. With the carrying handle moved to its horizontal position, centrifugation is clearly facilitated.

The embodiment in which the carrying handle, when mounted, has mounting means on its radial external end which are to be accommodated within the carrying handle mounting unit provided on the centrifuge bucket, and has connection means on its radial inner end for connection to the lid, has the advantage that the carrying handle can be connected to the centrifuge bucket without the need for a lid to be in place in order to transport the centrifuge bucket using the carrying handle.

Owing to the snail shell like design of the guideway, only one hand is required for handling the centrifuge container. The container can thus be opened, closed or transported by merely pivoting the carrying handle to the respective position. This considerably facilitates the use of a centrifuge container.

In particular, when the container lid is closed, the centrifuge container will be aerosol-tight.

Inserting the centrifuge container into the centrifuge is also clearly facilitated by the use of the carrying handle. The same is true for its withdrawal. In a particularly advantageous embodiment, the carrying handle is attached at two opposing carrying handle mounting units. The carrying handle mounting units are disposed opposite each other on the edge of the centrifuge bucket which ensures uniform distribution of the clamping force on the seal. In a particular advantageous embodiment, the connection means to the lid, and thus also the connection means for connecting the carrying handle to the centrifuge bucket, are provided in the form of interchangeable modules. Consequently, the carrying handle can be adapted for use with various different centrifuge bucket and lid designs.

The centrifuge container may be polygonal or circular in cross-section. In particular, the lid is provided with a seal which is capable of reliably ensuring aerosol-tight sealing of the container.

Furthermore, a unit consisting of attachment and connection means may be provided which may be detachably connected to a carrying handle.

Preferably, the lid is detachably connected to the centrifuge bucket so as to ensure that the centrifuge bucket can also be used without a lid.

Further advantages, features and potential applications of the present invention may be gathered from the description which follows, in conjunction with the embodiments illustrated in the drawings.

Figure 2:
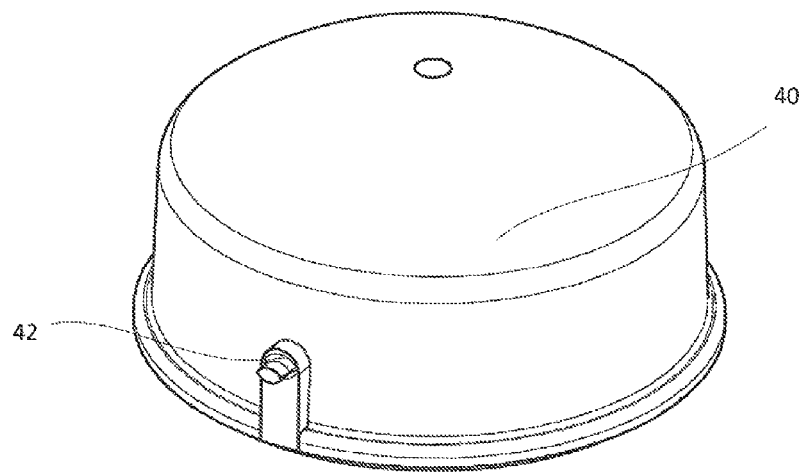
Figure 3:
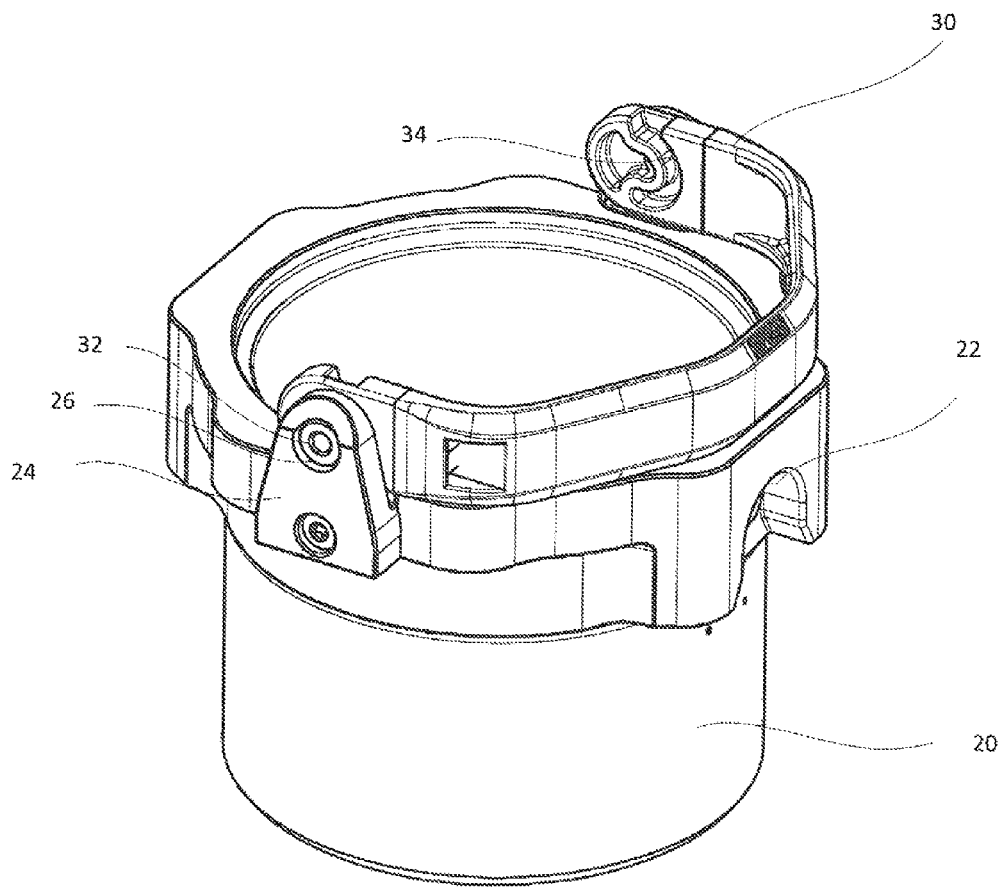
Figure 4:
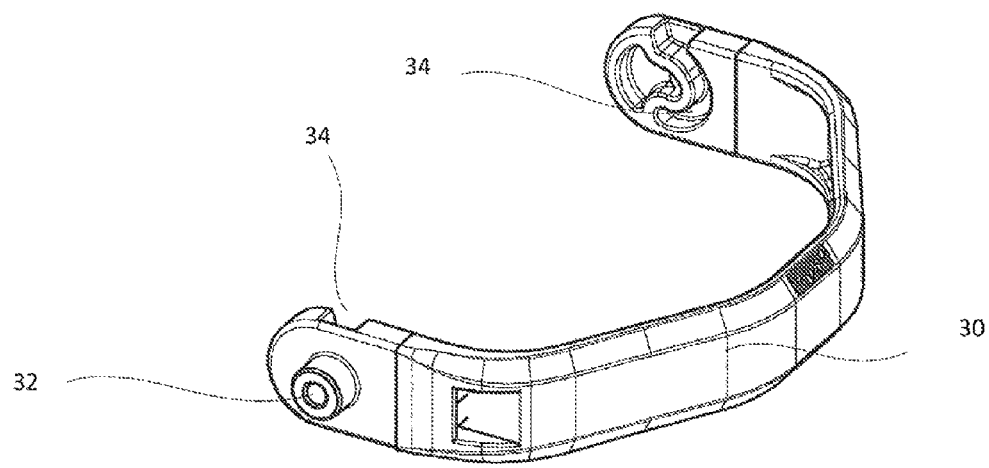
Figure 5:
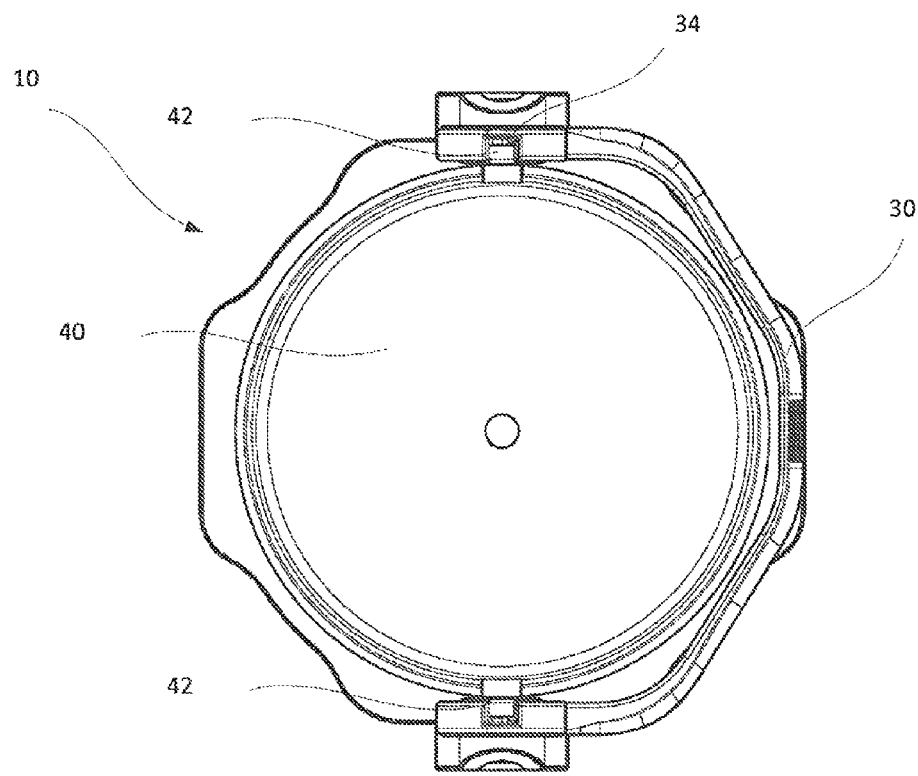
Figure 6:
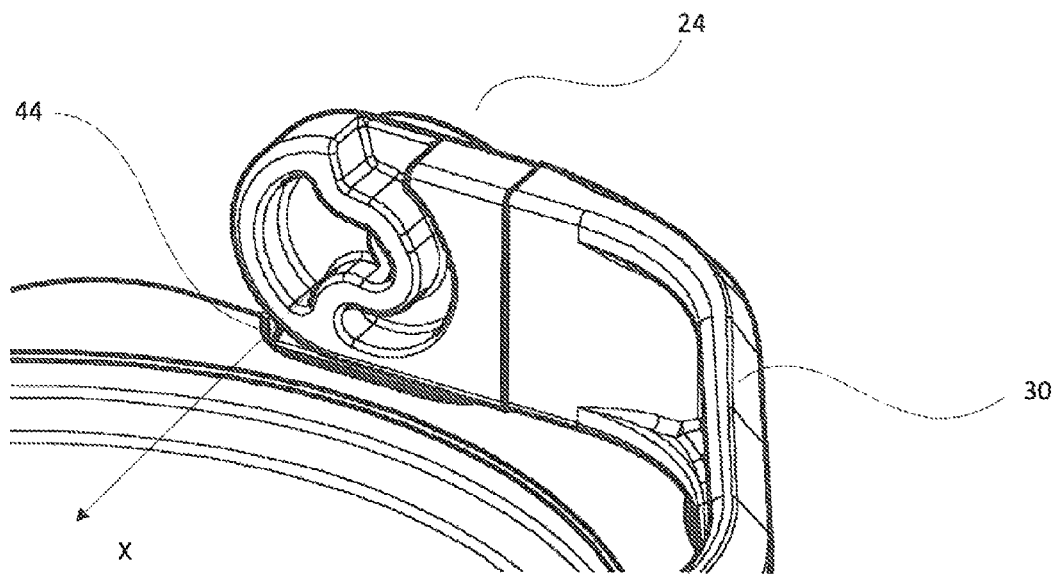
Figure 7:
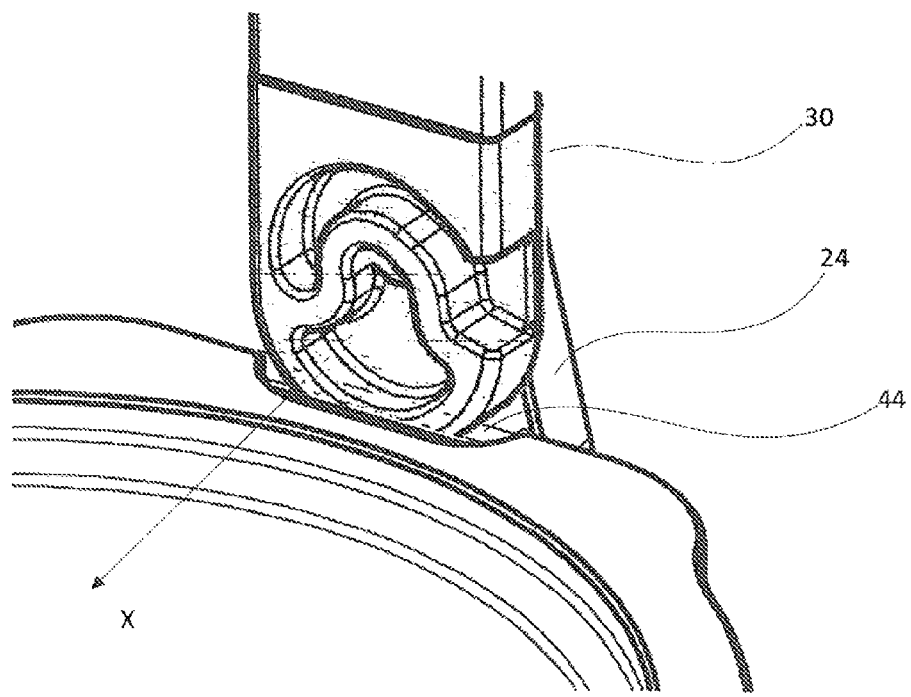

Throughout the description, the claims and the drawings, those terms and associated reference signs will be used as are notable from the enclosed list of reference signs. In the drawings is shown FIG. 1 a view of a centrifuge container of the present invention with a carrying handle and lid in place;

FIG. 2 a view of a lid according to the invention;

FIG. 3 a view of a centrifuge container of the invention with installed carrying handle;

FIG. 4 a view of a carrying handle with integrated guideway for accommodating a pin of the lid;

FIG. 5 a top view of a centrifuge container;

FIG. 6 a detailed view of the carrying handle mounting unit in an unsecured state, and FIG. 7 a detailed view of the carrying handle mounting unit in a secured state thereof.

FIG. 1 shows a closable centrifuge container 10 which comprises a centrifuge bucket 20, a carrying handle 30 and a lid 40. The centrifuge bucket 20 is in the form of a swinging bucket and thus has respective mounting recesses 22. Once the lid 40 is in place on the centrifuge bucket 20, it can be connected to the centrifuge bucket 20 by pivoting the carrying handle 30 into a vertical carrying position. This will close the centrifuge bucket 20 and thus also the centrifuge container 10.

The operating principle of the closing mechanism will now be explained in more detail with reference to the following figures.

FIG. 2 shows a lid 40 for a closable centrifuge container 10 which lid is adapted to be placed on the centrifuge bucket 20. The lid 40 has closing means which are provided in the form of pins 42 which are integrally mounted on the lid 40. These pins 42 can be made to engage a guideway 34 which is integrally formed in the carrying handle 30.

FIG. 3 is a perspective view of a centrifuge bucket 20 and its carrying handle 30 without the lid in place. The centrifuge bucket 20 has a carrying handle mounting unit 24 in which a recess 26 is formed. This recess 26 is adapted to accommodate a connecting pin integrally formed on the carrying handle. This is a simple way of connecting the carrying handle 30 to the centrifuge bucket 20. In this view, the carrying handle 30 is in an open position thereof. It can clearly be seen here that the guideway 34 provided in the handle end has an aperture which faces upward in an open position of the handle and which can accommodate the pins 42 of the lid 40. Once the lid 40 is in place and the carrying handle 30 has been pivoted, the pins 42 will be guided within said guideway 34 such that they will be pressed downward along the axis of the bucket which results in a clamping force to be exerted on the lid 40. This clamping force causes the centrifuge bucket 20 to be locked with the lid 40. In this way, the centrifuge container 10 can be carried when it is closed. In order to reopen the lid 40, the carrying handle 30 merely has to be pivoted by 90° into its horizontal position again. As only one hand is required for this, handling of the centrifuge container 10 is very easy.

FIG. 4 is a perspective view of the carrying handle 30. This view clearly shows the integrally formed mounting pin 32. This pin-like element of the carrying handle 30 is adapted to be accommodated in the recess 26 of the carrying handle mounting unit 24 on the container 20. However, a design is also conceivable in which the carrying handle mounting unit is provided in the shape of a pin and in which an annular recess is provided in the carrying handle. This design in the form of a pin 32 allows for a simple way of rotatably connecting the centrifuge bucket 20 to the carrying handle 30. Likewise clearly shown in FIG. 4 is the guideway 34 in the carrying handle 30 which extends such that the carrying handle 30—in an open position thereof—can accommodate the pins 42. As the handle is being pivoted into its vertical carrying position, these pins 42 will be guided along said guideway 34 in such a way that the centrifuge container 10 will ultimately be closed by the lid 40.

Moreover, it can be gathered from this view that the further course of the guideway is designed such that—when the handle is pivoted by another 90°—the clamping force which is made to act on the lid when the carrying handle 30 is in its vertical position and which thus keeps the lid 40 closed, will be retained and thus keep the lid 40 closed in a further horizontal position. This closed position will then be at an angle of 180° with respect to the open position.

This horizontal closed position in which the centrifuge container 10 rests on the centrifuge bucket 20 allows the centrifuge container 10 to be centrifuged very well in a closed state thereof. Using only one hand, an operator can thus pivot the carrying handle from its closed centrifugation position to its vertical carrying position. This carrying option also makes it easier to remove the centrifuge container 10 from the centrifuge. How the container is opened has already been described with reference to the preceding figures.

Preferably, the guideway may be designed to include a latching position in its pivoting range, in particular in its carrying position.

FIG. 5 is a view of a centrifuge container 10 of the present invention in which the lid 40 has been placed on the centrifuge bucket 20, with the carrying handle 30 being in its open position. It is clearly shown here how the closure pins 42 of the lid 40 are inserted in the guideway 34 of the carrying handle 30, said guideway having an opening that faces upwards.

This embodiment according to the invention thus provides a centrifuge container 10 which is very easy to handle and which allows for easy closing and opening of the centrifuge bucket with a lid 40.

FIG. 6 is a detailed view of the container 10 in the area of the carrying handle mounting unit 24. Mounted on the carrying handle mounting unit 24 is a carrying handle 30. A recess 44 is provided in the edge of the container near the pivotal point of said carrying handle 30.

In the horizontal position of the carrying handle 30 as shown in FIG. 6, the handle 30 does not engage the recess 44. The carrying handle can thus be detached from the carrying handle mounting unit 24 by moving it into the direction marked X, thus causing the integrally formed pin element 32 shown in FIG. 4 to be withdrawn from an annular bearing. This is possible in the position shown in FIG. 6.

FIG. 7 shows the same detail as FIG. 6 but with the carrying handle 30 in its vertical position. What is clearly visible in this position is that the end of the carrying handle 30 which faces the container now engages the recess 44. Moving the carrying handle 30 and thus detaching it from the mounting unit 24 on the container is not possible as any movement in the direction marked X will be blocked by the recess 44. This thus ensures that the carrying handle 30 will not be lost during transport of the container.

LIST OF REFERENCE SIGNS

10 centrifuge container
20 centrifuge bucket
22 swinging bucket mounting recess
24 carrying handle mounting unit
26 recess
30 carrying handle
32 integrally formed pin
34 guideway
40 lid
42 pin
44 recess

The invention claimed is:

1. A centrifuge container (10), comprising:
  a centrifuge bucket (20);
  a locking lever (30), said locking lever (30) is a carrying handle;
  a lid (40);
  at least one carrying handle mounting unit (24) integrally formed on said centrifuge bucket (20);
  said carrying handle pivotably mounted on said at least one carrying handle mounting unit (24) integrally formed on said centrifuge bucket (20), said carrying handle pivots at least from an open horizontal position to a closed vertical position thereof;
  said lid (40) includes connection means;
  said carrying handle includes connection means;
  said lid connection means and said carrying handle connection means engage each other such that said lid (40) is locked to said centrifuge bucket in said closed vertical position of said carrying handle and such that said lid (40) is released from said centrifuge bucket in said open horizontal position of said carrying handle (30); and,
  said carrying handle in said closed vertical position allows said centrifuge container (10) to be carried.

2. The centrifuge container (10) as claimed in claim 1 wherein said carrying handle (30) is pivotable from said horizontal open position to said closed vertical position to a closed horizontal position thereof.

3. The centrifuge container (10) as claimed in claim 1, further comprising:
  said carrying handle includes first and second ends;
  first and second carrying handle mounting units (24) provided on opposite sides of said centrifuge bucket (20); and,
  said first and second carrying handle mounting units (24) are connected to said first and second ends of said carrying handle (30).

4. The centrifuge container (10) as claimed in claim 1 wherein said lid connection means include pins (42).

5. The centrifuge container (10) as claimed in claim 1, further comprising:
  said carrying handle connection means include guideways (34) and said lid connection means include pins (42), and, said pins (42) are guided in said guideways (34) when said carrying handle is rotated between said horizontal open position and said closed vertical position.

6. The centrifuge container (10) as claimed in claim 1, further comprising:
said carrying handle has outwardly projecting attachment means (32) connected to said carrying handle mounting unit (24); and,
said carrying handle connection means include guideways (34).

7. The centrifuge container (10) as claimed in claim 1, further comprising:
said centrifuge bucket (20) is a swinging bucket, said swinging bucket includes mounting recesses (22) for connection to a swing axle of a centrifuge, and, said carrying handle mounting units (24) being disposed in an axis orthogonal to said swing axle.

8. A centrifuge container (10), comprising:
a centrifuge bucket (20);
a carrying handle;
at least one carrying handle mounting unit (24) integrally formed on said centrifuge bucket (20);
said carrying handle pivoted about said at least one carrying handle mounting unit from a horizontal open position to a closed vertical position thereof;
said carrying handle (30) allows said centrifuge bucket (20) to be carried in said closed vertical position;
said carrying handle (30) is detachably mounted on said carrying handle mounting unit (24); and,
loss protection means prevent said carrying handle (30) from becoming detached from said carrying handle mounting unit (24) in said closed vertical position of said carrying handle.

9. The centrifuge container of claim 8, further comprising:
said centrifuge bucket (20) includes an edge zone;
said loss protection means include a recess (44) in said edge zone of said centrifuge bucket (20);
said carrying handle (30) engages said recess when said carrying handle is in said closed vertical position of said carrying handle thus preventing said carrying handle (30) from becoming detached from said carrying handle mounting unit (24).

10. A centrifuge container (10), comprising:
a centrifuge bucket (20);
a carrying handle;
a lid (40);
said lid (40) includes connection means;
said centrifuge bucket (20) includes connection means;
said carrying handle (30) includes a first connection means and a second connection means;
said first connection means of said carrying handle engage said centrifuge bucket connection means such that said carrying handle pivots at least from an open horizontal position to a closed vertical position thereof; and,
said lid connection means and said second connection means of said carrying handle engage each other such that said lid (40) is locked in said closed vertical position of said carrying handle and such that said lid (40) is released in said open horizontal position of said carrying handle.

11. The centrifuge container of claim 10, further comprising:
said connection means of said centrifuge bucket (20) include a carrying handle mounting unit (24); and,
loss protection means prevent said carrying handle (30) from becoming detached from said carrying handle mounting unit (24) in said closed vertical position of said carrying handle.

12. The centrifuge container of claim 11, further comprising:
said centrifuge bucket (20) includes an edge zone;
said loss protection means include a recess (44) in said edge zone of said centrifuge bucket (20);
said carrying handle (30) engages said recess when said carrying handle is in said closed vertical position of said carrying handle thus preventing said carrying handle (30) from becoming detached from said carrying handle mounting unit (24).

13. The centrifuge container (10) as claimed in claim 10 wherein said carrying handle (30) is pivotable from said horizontal open position to said closed vertical position to a closed horizontal position thereof.

14. The centrifuge container (10) as claimed in claim 10, further comprising:
said carrying handle includes first and second ends;
first and second said carrying handle mounting units (24) provided on opposite sides of said centrifuge bucket (20); and,
said first and second carrying handle mounting units (24) are connected to said first and second ends of said carrying handle (30).

15. The centrifuge container (10) as claimed in claim 10 wherein said lid connection means include pins (42).

16. The centrifuge container (10) as claimed in claim 10, further comprising:
said carrying handle connection means include guideways (34) and said lid connection means include pins (42), and, said pins (42) are guided in guideways (34) when said carrying handle is rotated between said horizontal open position and said closed vertical position.

17. The centrifuge container (10) as claimed in claim 10, further comprising:
said first connection means of said carrying handle includes outwardly projecting attachment means (32); and,
said second connection means of said carrying handle includes guideways (34).

18. The centrifuge container (10) as claimed in claim 10, further comprising:
said centrifuge bucket (20) is a swinging bucket, said swinging bucket includes mounting recesses (22) for connection to a swing axle of a centrifuge, and, said carrying handle mounting units (24) being disposed in an axis orthogonal to said swing axle.

\* \* \* \* \*